United States Patent [19]

Maeda

[11] Patent Number: 5,214,545
[45] Date of Patent: May 25, 1993

[54] SIGNAL ERASING APPARATUS

[75] Inventor: Masaya Maeda, Kanagawa, Japan

[73] Assignee: Canon Kabushiki Kaisha, Tokyo, Japan

[21] Appl. No.: 657,892

[22] Filed: Feb. 19, 1991

Related U.S. Application Data

[63] Continuation of Ser. No. 246,892, Sep. 16, 1988, abandoned, which is a continuation of Ser. No. 948,399, Dec. 31, 1986, abandoned, which is a continuation of Ser. No. 666,884, Oct. 31, 1984, abandoned.

[30] Foreign Application Priority Data

Nov. 2, 1983 [JP] Japan .................................. 58-206573

[51] Int. Cl.$^5$ .......................... G11B 21/02; G11B 5/02
[52] U.S. Cl. ...................................... 360/75; 360/57; 360/66
[58] Field of Search .................................. 360/13-14.3, 360/55, 61, 69, 72.1, 77.2, 74.1, 57, 66, 74.4, 75, 78.01-78.04, 78.08, 78.12, 78.13, 35.1, 105, 106; 364/30, 32, 33, 41; 358/906, 909

[56] References Cited

U.S. PATENT DOCUMENTS

| | | | |
|---|---|---|---|
| 3,723,668 | 3/1973 | Ritchey, Jr. ............................ | 360/66 |
| 3,768,082 | 10/1973 | Stapleford et al. ............... | 360/78.01 |
| 3,789,378 | 1/1974 | Bonzano et al. ....................... | 360/78 |
| 4,005,483 | 1/1977 | Kuwano ................................. | 360/69 |
| 4,270,150 | 5/1981 | Diermann et al. .................... | 360/10 |
| 4,290,088 | 9/1981 | Beecroft ................................. | 360/66 |
| 4,480,277 | 10/1984 | Hara et al. ............................. | 360/69 |
| 4,670,799 | 6/1987 | Ogura et al. ........................... | 360/66 |

FOREIGN PATENT DOCUMENTS

| | | |
|---|---|---|
| 2113878 | 10/1971 | Fed. Rep. of Germany . |
| 2730411 | 2/1978 | Fed. Rep. of Germany . |
| 3214541 | 11/1982 | Fed. Rep. of Germany . |
| 57-21133 | 5/1982 | Japan . |

OTHER PUBLICATIONS

Que's Computer User's Dictionary, Que Corporation, Carmel, Indiana, 1990, p. 364.

Primary Examiner—Jerry Smith
Assistant Examiner—Steven R. Garland
Attorney, Agent, or Firm—Anderson Kill Olick & Oshinsky

[57] ABSTRACT

A signal erasing apparatus continuously erases recorded signals from a plurality of selected recording tracks formed on a rotating type record bearing medium which has signals recorded in a plurality of circular recording tracks. The apparatus comprises signal erasing apparatus including one erasing head; shifting apparatus for shifting the erasing head to oppose it to each of the recording tracks of the record bearing medium; rotating apparatus for rotating the record bearing medium relative to the erasing head; designating apparatus for designating beforehand a plurality of specific recording tracks having the signal to be erased from the medium; and control apparatus which, in response to the designating apparatus, controls the signal erasing apparatus and the head shifting apparatus to cause them to continuously erase from the medium the signals recorded in the designated recording tracks.

16 Claims, 7 Drawing Sheets

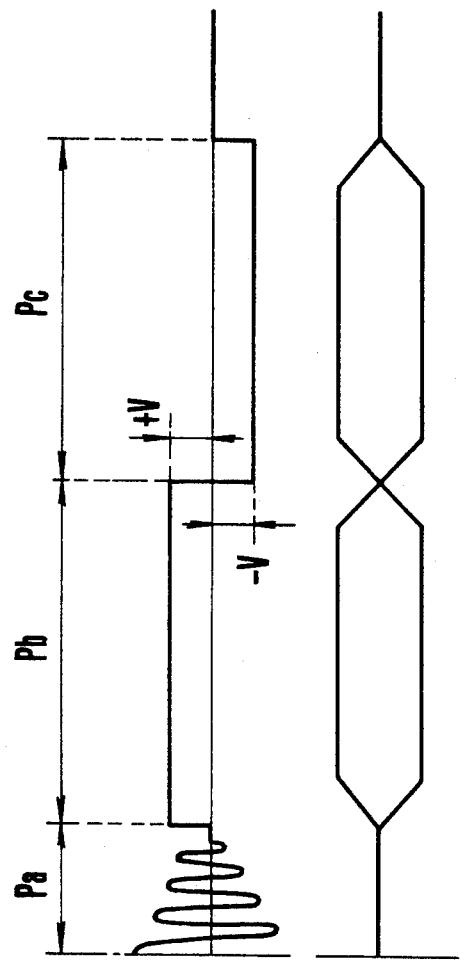
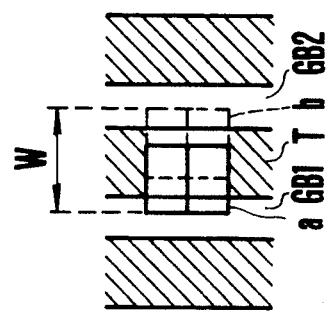
FIG.4A
FIG.4B
FIG.5

SIGNAL ERASING APPARATUS

This is a continuation application of Ser. No. 07/246,892, filed Sep. 16, 1988, now abandoned; which is a continuation application of Ser. No. 06/948,399, filed Dec. 31, 1986, now abandoned and which is a continuation application of Ser. No. 06/666,884, filed Oct. 31, 1984, now abandoned.

BACKGROUND OF THE INVENTION

1. Field of the Invention

This invention relates to a signal erasing apparatus and more particularly to an apparatus capable of continuously erasing recorded signals from a plurality of selected recording tracks formed on a rotating type record bearing medium, which has signals recorded in a plurality of circular recording tracks.

2. Description of the Prior Art

For the recording and/or reproducing apparatuses of the kind which uses, for example, a rotating type record bearing medium such as a magnetic disc or a magnetic drum, to record signals while forming recording tracks in a circular shape (in a concentric shape in the case of a disc or in an annular shape in the case of a drum) and to reproduce the signals thus recorded, it is advantageous to be able to erase the recorded signal from the medium. For erasing the whole recorded signal from a record bearing medium, use of an erasing device called a bulk eraser or a bulk erasing head is advantageous. The erasing device of this type is, however, disadvantageous in that it cannot selectively erase some specific signal recorded in one or a plurality of the recording tracks.

In such selective erasing, an erasing head which erases at once the signal recorded in one recording track on the record bearing medium (hereinafter referred to as a single track erasing head) must be used regardless of whether a recording and/or reproducing head is also used for erasing recorded signals. Where the signals of a plurality of recording tracks are to be selectively erased from the record bearing medium by means of the above-stated single track erasing device, however, the erasing operation necessitates very troublesome processes. For example, upon completion of an erasing operation on one recording track, the erasing head must be shifted to the next track and again the recorded signal erasing operation must be performed on the next track. To simplify the erasing operation, there has been proposed an erasing device which perform erasing by designating the recording track to be erased and after that subsequent tracks are automatically and continuously or consecutively erased until an erasing operation stopping or releasing member is operated to bring the erasing operation to an end. This device is advantageous in that it deletes troublesome operation processes in continuously carrying out an erasing operation on a plurality of recording tracks. However, a disadvantage of this device lies in that some recording tracks that must not be erased might be erased if the erasing stopping member is not operated on time.

The present invention is directed to the solution of the above-stated problem of the prior art device. It is therefore a principal object of the invention to provide a signal erasing apparatus which is capable of automatically and accurately erasing, in response to a simple operation thereon, signals recorded in a plurality of selected recording tracks from a rotating type record bearing medium having signals recorded thereon in a plurality of circular recording tracks.

It is another object of the invention to provide a signal erasing apparatus which is capable of erasing a signal or signals recorded in one or a plurality of selected recording tracks.

The above and further objects and features of the invention will become apparent from the following detailed description of preferred embodiments thereof taken in conjunction with the accompanying drawings.

SUMMARY OF THE INVENTION

To attain the first object of the invention, a signal erasing apparatus embodying an aspect of this invention comprises signal erasing means including an erasing head; head shifting means which opposes the erasing head to each of a plurality of recording tracks formed on a record bearing medium; rotating means for rotating the record bearing medium relative to the erasing head; designating means for designating beforehand on the medium a plurality of the recording tracks to be erased; and control means which, in response to the designating means, controls the signal erasing means and the head shifting means to cause them to continuously erase from the medium the signal recorded in the designated recording tracks.

To attain the second object of the invention, in an embodiment of the invention the above designating means is capable of designating a single specific recording track in addition to designating a plurality of recording tracks to be erased; and the above-stated control means controls the above-stated erasing means and the head shifting means erases solely the signal from the designated recording track. The designating means of this embodiment is provided with a first designating member for designating one track which is located at the first address among a plural number "n" of consecutive recording tracks to be erased and a second designating member for designating the number "n" of tracks. With the designating means arranged in this manner, a plurality of the recording tracks to be erased can be designated prior to an erasing operation. In this case, if the plural number "n" is changed to "1", the above-stated single track alone can be designated to be erased.

BRIEF DESCRIPTION OF THE DRAWINGS

Some preferred embodiments of this invention are arranged as shown in the accompanying drawings, wherein:

FIG. 4A is a wave form chart showing the wave form of a voltage to be applied to a piezoelectric bimorph element used for the erasing apparatus of FIG. 3.

FIG. 4B is an illustration of an erasing signal to be supplied to the magnetic head of FIG. 3.

FIG. 5 is an illustration of the shifting position of the magnetic head which is within the erasing apparatus shown in FIG. 3.

DETAILED DESCRIPTION OF THE PREFERRED EMBODIMENT

Generally, the number of recording tracks that is formable on a record bearing medium, i.e. the recording capacity of a medium, is limited. Therefore, according to a preferred mode of an embodiment of the invention, an erasing operation automatically stops upon erasure completion of the last of the tracks formed on the record bearing medium when the plural number "n" of consecutive recording tracks designated by the above-stated designating means to be erased exceeds the last track of the medium. For example, with the number of recording tracks that can be formed on the medium limited to 50, if 20 consecutive recording tracks ranging from the 36th tack to the 55th track are designated to be erased, the above-stated control means brings the erasing operation to an end upon erasure completion of the 50th track. This arrangement ensures a correct erasing operation against an erroneous designation. In this instance, it is advantageous to provide the apparatus with some warning or alarm means for informing the operator that the erasing operation has come to a stop with the recording tracks having been erased, to the last one formed on the medium, since the designation is wrong. The provision of such a warning arrangement is advantageous not only for an erasing device but also for a head shifting control device of a recording and/or reproducing apparatus. In other words, if the number of recording tracks designated for recording or reproduction or their addresses range beyond the address of the last track formed on the record bearing medium, such a warning arrangement informs the operator of the inappositeness of the designated number or addresses while performing recording or reproduction on the last track. This arrangement is extremely advantageous for a recording and/or reproducing apparatus.

Before describing the erasing apparatus embodying the present invention, the outline of the arrangement of a magnetic disc and a head driving mechanism is explained.

Figure 1:
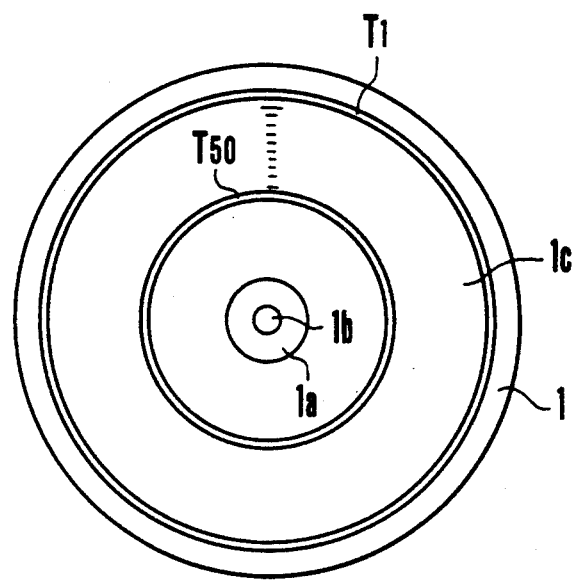
FIG. 1 is an illustration of recording tracks formed on a magnetic disc.

FIG. 1 shows a magnetic disc 1 which is employed as a rotating type record bearing medium. The magnetic disc 1 has a unit length, such as one field or one frame portion of the TV signal, of still picture information recorded in each of, say, 50 concentric recording tracks from a first one T1 to a fiftieth one T50 formed thereon. A center hub 1a which has a center hole 1b is secured to the middle of the disc 1.

Figure 2:
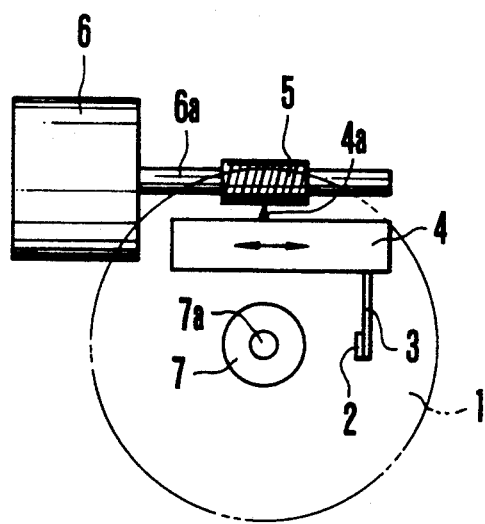
FIG. 2 is a plan view showing a head and the essential parts of a disc driving mechanism to which this invention is applicable.

FIG. 2 shows a head driving arrangement. A magnetic signal transducing head 2 is used for recording, reproducing and erasing. The head 2, of course, may be used solely for erasing. A piezoelectric bimorph element 3, as a head moving member, has the magnetic head 2 secured to its free end and shifts the position of the head 2 slightly. The other end of the element 3, which is opposite the free end having the magnetic head 2 secured thereto, is secured to a head carrier 4 which is moved and guided by a known guiding device (not shown). The guide device guides the head carrier 4, in parallel relationships therewith, in the directions of the arrows shown in FIG. 2.

A projection 4a which is protruding from a part of the head carrier 4 is engaged with a screw 5. The screw 5 is secured to an output shaft 6a of a stepping motor 6. With the head carrier 4 thus engaged with the screw 5, it moves forward or backward in the direction of the arrow as the stepping motor 6 is in normal or reverse rotation. The arrangement is such that the head 2 shifts its position in the radial direction of the magnetic disc 1 based on the rotation of the stepping motor 6. The head 2 moves forward, or toward the center of the disc 1, when the stepping motor 6 rotates in its normal direction and moves backward, or toward the outer periphery of the disc 1, when the motor 6 rotates in the reverse direction. The head 2 moves on the disc 1 one track pitch for a rotation angle per step of the motor 6. A disc rotating motor 7 has its output shaft 7a formed in the shape of a spindle. The magnetic disc 1 is mounted on the spindle 7a through the center hole 1b of its center hub 1a.

Figure 3:
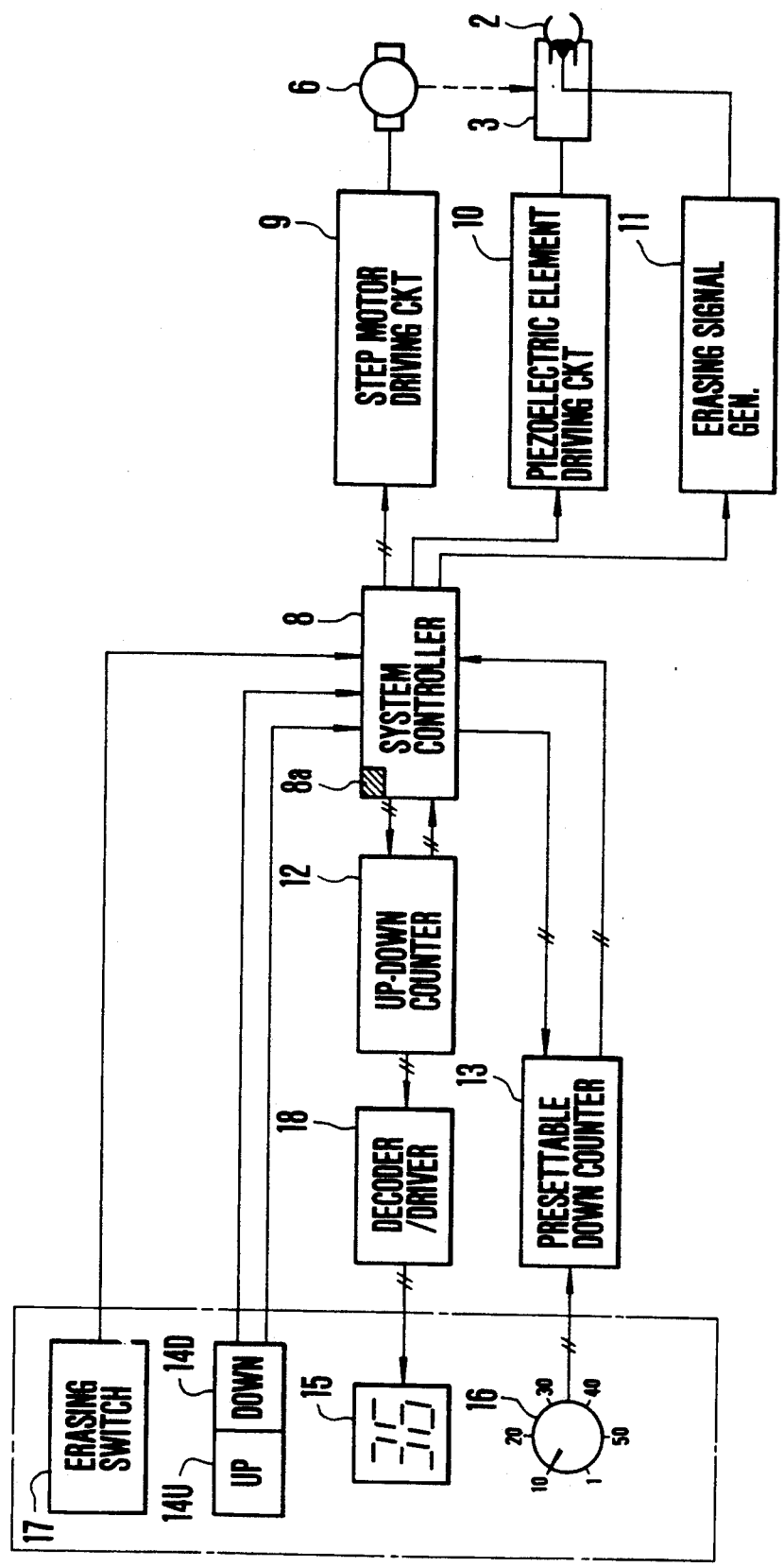
FIG. 3 is a block diagram showing an erasing apparatus arranged according to the invention in an embodiment.

FIG. 3 shows an erasing apparatus arranged according to the invention in an embodiment thereof. In FIG. 3, reference numerals 2, 3, 6 and 7 respectively identify the magnetic head, the piezoelectric bimorph element, the stepping motor and the disc rotating motor of FIG. 2. The apparatus includes a system controller 8 which includes a CPU, for example. A step motor driving circuit 9 drives the stepping motor 6 based on pulses and a rotating direction instructing signal produced from the system controller 8. The apparatus is provided with a piezoelectric bimorph element driving circuit 10, an erasing signal generator 11, and an up-down counter 12. The address of a recording track, which the head 2 currently has access to, is stored at the up-down counter 12. A decoder/driver 18 converts the output of the up-down counter 12 into display datum and drives a display device 15 on the basis of the display datum. A presettable down counter 13 memorizes the number of recording tracks to be erased and counts them down based on the shift of the head 2 from one track to another under the control of the controller 8 only when the apparatus is in an erasing mode. Therefore, the counter 13 memorizes the remaining number of tracks to be erased.

A part of the apparatus encompassed with a one-dot chain line indicates an operation and display part. This part includes an up switch 14U and a down switch 14D. These switches 14U and 14D are provided for the purpose of giving instructions for shifting the head 2 forward and backward, that is, to move the head 2 toward the center of the disc 1 and toward the outer periphery thereof, as mentioned in the foregoing. The display device 15 shows the address of the track to which the head 2 currently has access. The display device 15 includes seven-segment display elements forming two figures. A selection switch 16 permits setting a number of recording tracks to be erased. A number of tracks, between 1 and 50, is settable with the switch 16. The setting value thus obtained is stored at the counter 13. A reference numeral 17 identifies an erasing switch.

Next, the single track erasing operation of this embodiment will be described below with reference to FIGS. 4A, 4B and 5, in addition to FIG. 3:

In the single track erasing operation, the operator operates the up switch 14U or the down switch 14D to turn it on, causing the head 2 to have access to a specific recording track to be erased. As mentioned in the foregoing, the up-down counter 12 always stores the address of the track to which the head 2 has access. This address is displayed by the display device 15 through the decoder/driver 18. More specifically, the system controller roller 8 produces a pulse and a rotation direction indicating signal in response to the operation of the up switch 14U or the down switch 14D. These pulses and signals then cause the step motor driving circuit 9 to produce a motor driving pulse which in turn causes the stepping motor 6 to normally or reversely rotate. At this instant, the system controller 8 supplies the up-down counter 12 with a count pulse and a count mode control signal. Accordingly, the track address which is displayed at the display device 15 always coincides with the position of the head 2.

When the erasing switch 17 is operated after the head 2 reaches a recording track to be erased, a sequence of processes for a single track erasing operation are carried out in the following manner: Upon commencement of the erasing operation, a voltage which is as represented by FIG. 4A is impressed on the piezoelectric bimorph element 3. The piezoelectric bimorph element 3 is such that the free end thereof shifts its position an extent proportional or nearly proportional to this voltage in the direction corresponding to the polarity of the voltage applied. The element 3 is arranged in such a manner that the displacement of the free end thereof takes place in a direction virtually perpendicular to the recording track (see FIG. 2). The voltage applied to the piezoelectric bimorph element 3, in this case, consists of three different voltage periods or sections Pa, Pb and Pc. First, during a predetermined first section Pa, an AC attenuation signal is applied to the element 3 for removal of a residual strain from the element 3. This is for the purpose of removing an offset due to a strain resulting from the hysteresis characteristic or residual stress of the element 3, because such a strain tends to take place when the piezoelectric bimorph element 3 is used for tracking control and the like. Next, during a predetermined second section Pb, a voltage +V is applied to the element 3 to displace it in such a manner that one edge of the magnetic head 2 is shifted to a position within a guard band GB1 between the recording track to be erased and another on the magnetic disc 1, as indicated by a reference symbol "a" in FIG. 5. Then, during a predetermined third section Pc which is about the same length of time as the above-stated section Pb, a voltage −V which is of a polarity opposite that of the voltage of the section Pb is applied to the element 3 to displace it in such a manner that the magnetic head 2 reaches a position nearly symmetrical with the above-stated shifted position relative to the center line of the track to which the head 2 is having acess, that is, the other edge of the head 2 then comes within a guard band GB2 on the opposite side, as indicated by a symbol "b" in FIG. 5. During each of the sections Pb and Pc, an erasing signal is supplied from the erasing signal generator 11 to the magnetic head 2 for erasing the specific track T. In this instance, the sections Pb and Pc span a length of time of several seconds which is longer than the length of time required for one turn of the magnetic disc 1.

Since the recording track T is erased in this manner over a wide erasing locus W, one track T can be completely erased regardless of any expansion or contraction of the disc 1 due to changes in temperature and humidity or any head positioning error made by the head shifting mechanism.

Figure 6:
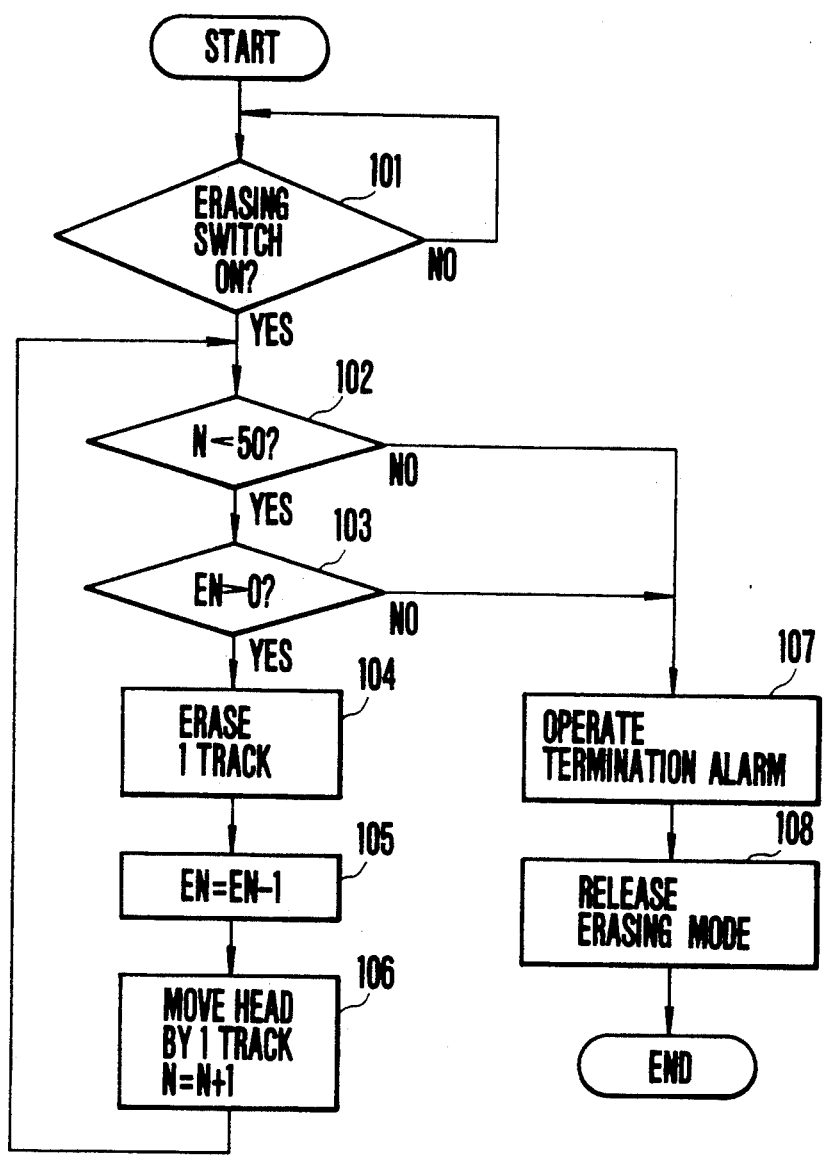
FIG. 6 is a flow chart showing a continuous erasing operation performed by the erasing apparatus shown in FIG. 3.

Referring to FIG. 6, a continuous or consecutive erasing operation of this embodiment is as follows: For a continuous erasing operation, the operator sets a desired number of consecutive recording tracks, counting from a desired track address. Then, for example, the above-stated single track erasing operation is continuously repeated. The starting track for the continuous erasing operation is a track which the head 2 currently has access to. However, if necessary, the head 2 may be shifted to another track by operating the up switch 14U or the down switch 14D in the above-stated manner. In this instance, the total number of recording tracks on the magnetic disc 1 is assumed to be 50, in the same manner as in FIG. 1.

As mentioned in the foregoing, information on the address of the track to which the head 2 has access is stored at the up-down counter 12. This value is assumed to be N and the number of erasing tracks which is set at the presettable down counter 13 with the switch 16 operated by the operator to be EN. First, at a step 101 of FIG. 6, the erasing switch 17 is turned on. At a step 102, it is confirmed that the address N of the track to which the head 2 has access is not larger than 50. At a step 103, it is confirmed that the number of tracks EN set at the counter 13 is larger than 0. At a step 104, one of the tracks is erased in the same manner as described in the foregoing. Upon completion of the erasing process on one track, the counter 13 counts down by 1 and 1 is subtracted from the set value EN at a step 105. The head 2 is then shifted one track pitch. And at this instant, the value stored at the counter 12 has one added thereto. These processes are repeated to perform a continuous erasing operation. Then, if the value N stored in the counter 12 becomes larger than 50 or the value EN stored in the counter 13 becomes equal to 0, a termination alarm device (not shown) operates and the erasing mode is released (at steps 107 and 108). In the example of the operation given above, the continuous erasing operation is performed with the head 2 shifted in the direction in which the track address increases. It will be apparent from the above description that a continuous erasing operation can be likewise carried out by shifting the head 2 in the reverse direction in which the track address decreases instead of increasing.

For the purpose of a judgement which is to be made at the steps 102 and 103 of FIG. 6, the system controller 8 stores at its memory part 8a a datum corresponding to the count value N=50 of the up-down counter 12 and another datum which corresponds to the count value EN=0 of the down counter 13.

Figure 7:
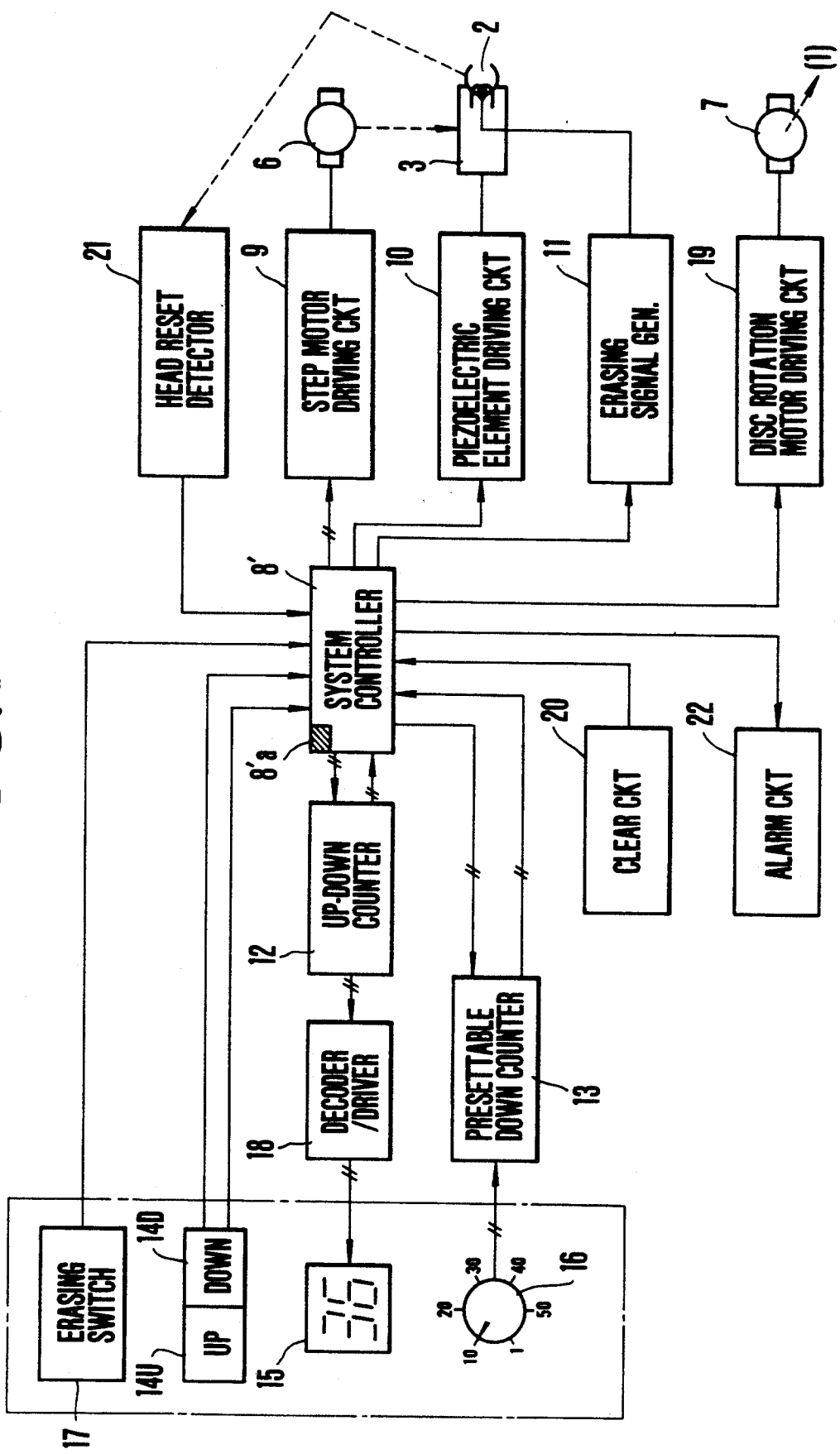
FIG. 7 is a block diagram showing an example of a modification of the erasing apparatus shown in FIG. 3.
Figure 8A:
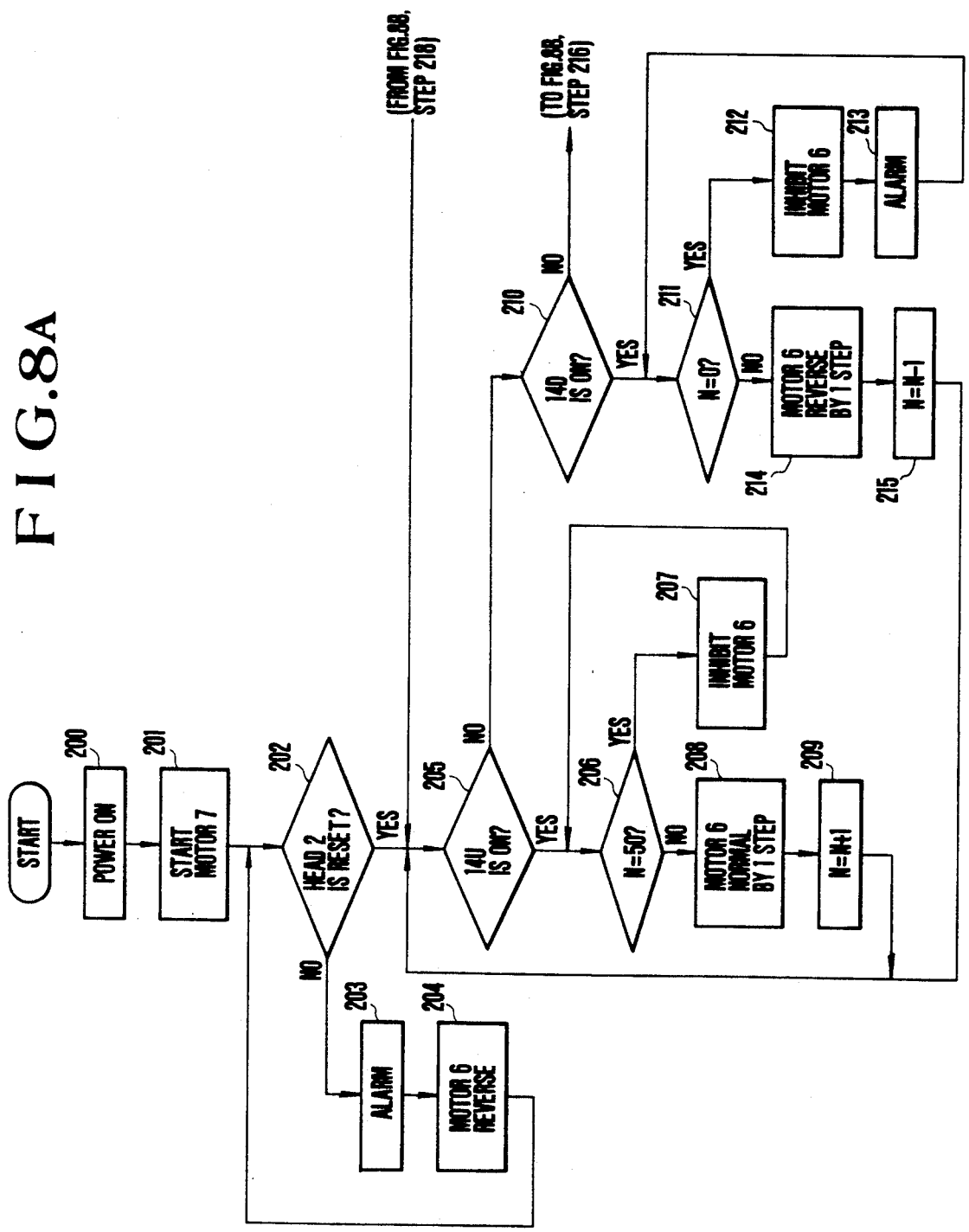
FIGS. 8A and 8B are flow charts showing the operations of the erasing apparatus shown in FIG. 7.

FIG. 7 shows, by way of example, a modification of the embodiment described above. In FIG. 7, the elements identifies by the same reference numerals as those shown in FIGS. 2 and 3 perform the same functions and are arranged in the same manner. The modification example is provided with a system controller 8' which corresponds to the system controller 8 of FIG. 3. The controller 8' is provided with a memory part 8'a for storing a datum corresponding to the count value N=50 and N=51 of the up-down counter 12 and a datum corresponding to the count value EN=0 of the down counter 13. A disc rotating motor driving circuit 19 causes the disc rotating motor 7 to rotate at a predetermined rotational speed in response to instruction from the controller 8'. This predetermined rotational speed is a speed corresponding to the field or frame frequency of television and is 3,600 or 1,800 rpm according to the NTSC color system and 3,000 or 1,500 rpm in the PAL system. A clear circuit 20 is provided for the controller 8'. A head reset detector 21 detects that the head 2 is shifted and reset in a predetermined position which is a No. 0 track position, located away from a first track T1 by one track pitch on the side of the outer periphery of the disc 1 as shown in FIG. 1. The modification further includes an alarm circuit 22. The operation of this modification example is described below with reference to FIGS. 8A and 8B:

When the power supply of the apparatus turns on at a step 200 of FIG. 8A, the system controller 8' is cleared or reset by a clear signal produced from the clear circuit 20. With the controller 8' reset, the counters 12 and 13 are cleared and their contents respectively become zero. Accordingly, the display device 15 displays "00". Furthermore, the controller 8' at that time instructs the disc rotating motor driving circuit 19 to actuate the disc rotating motor 7. In response to the instruction, the driving circuit 19 causes the motor 7 to begin to operate at a step 201 of FIG. 8A. Thus, the disc 1 begins to rotate. Under this condition, the controller 8' determines, on the basis of the output of the head reset detector 21, whether the head 2 is reset in the initial position or the No. "0" track position thereof at a step 202 of FIG. 8A. If not, the controller 8' causes the alarm circuit 22 to produce an alarm signal at a step 203 of FIG. 8A and, at the same time, instructs the step motor driving circuit 9 to reversely rotate the stepping motor 6. In response to this instruction, the driving circuit 9 causes the motor 6 to reversely rotate stepwise at a step 204 of FIG. 8A. With the motor 6 reversely rotated, the head carrier 4 is moved to the right, as viewed on FIG. 2 and described in the foregoing with reference to FIG. 2. Accordingly, the head 2 is shifted toward the outer periphery of the disc 1. When the head 2 reaches its initial position, the output of the detector 21 changes. In response to this change, the controller 8' instructs the driving circuit 9 to stop the motor 6. The motor 6 stops and the head 2 is reset in the initial position. At this point of time, the controller 8' instructs the alarm circuit 22 to stop the alarm. The alarm circuit 22 complies with this instruction.

When the up switch 14U or the down switch 14D is operated and turned on under this condition for selection of the track to be erased, the controller 8' finds out which of the switches 14U and 14D is turned on at a step 205 or 210 of FIG. 8A. If the down switch 14D is turned on, the controller 8' further finds out whether or not the count value N of the counter 21 is N=0 (at a step 211 of FIG. 8A). If it is N=0, the controller 8' prohibits the motor 6 from operating (at a step 212 of FIG. 8A) and at the same time instructs the alarm circuit 22 to produce an alarm (at a step 213 of FIG. 8A).

On the other hand, if it is the up switch 14U that is turned on, the controller 8' finds out whether or not the count value N of the counter 12 is N=50 (at a step 206 of FIG. 8A). If the count value is N=50, the controller 8' inhibits the motor 6 from operating (at a step 207 of FIG. 8A). If the count value is N≠50, the controller 8' instructs the step motor driving circuit 9 to normally rotate the motor 6 one step (at a step 208 of FIG. 8A). The head 2 is then shifted toward the center of the disc 1 an extent corresponding to one track pitch. The head 2 is thus brought to the first track position. At the same time, the controller 8' causes the up-down counter 12 to count up by one (at a step 209 of FIG. 8A). As a result, the count value of the counter 12 becomes "1". The display of the display device 15 then changes from "00" to "01". Next, the controller 8' finds out whether the switch 14U is turned on (at the step 205 of FIG. 8A). In this manner, the head 2 is shifted toward the center of the disc 1 every time the switch 14U is turned on or as long as the switch 14U remains on. And the position of the head 2 on the disc 1 (i.e. the track position) is displayed at the display device 15. Upon arrival of the head 2 at a 50th track position, the answer at the step 206 of FIG. 8A becomes "YES". Therefore, at this point of time, the controller 8' prohibits further normal rotation of the motor 6 (at the step 207 of FIG. 8A).

During the above-stated operation, if the head 2 is shifted beyond a specific recording track to be erased, the head 2 can be brought back to the desired track by turning on the down switch 14D. With the switch 14D thus turned on for that purpose, the controller 8' instructs the step motor driving circuit 9 to reversely rotate the stepping motor 6 one step on the condition that the answer at the step 211 of FIG. 8A is then "NO". In response to that instruction, the motor 6 is reversely rotated (at a step 214 of FIG. 8A) to shift thereby the head 2 toward the outer periphery of the disc 1 an extent corresponding to one track pitch. At that instant, the controller 8' causes the up-down counter 12 to count down by one (at a step 215 of FIG. 8A). In that case also, the reverse rotation of the motor 6 continues every time the switch 14D is turned on or as long as the switch 14D is kept on. When the head 2 is brought back to its initial position, the controller 8' inhibits the operation of the motor 6 with the count value N becoming N=0 (at the step 212 of FIG. 8A) and also causes the alarm circuit 22 to turn on (at the step 213 of FIG. 8A).

After a specific track which is desired to be erased is selected in the above-stated manner, the switch 16 is operated to set a number of tracks to be erased including this selected track. In the illustration given in FIG. 7, a total of 10 tracks from a 36th track to a 45th track are set to be erased.

Figure 8B:
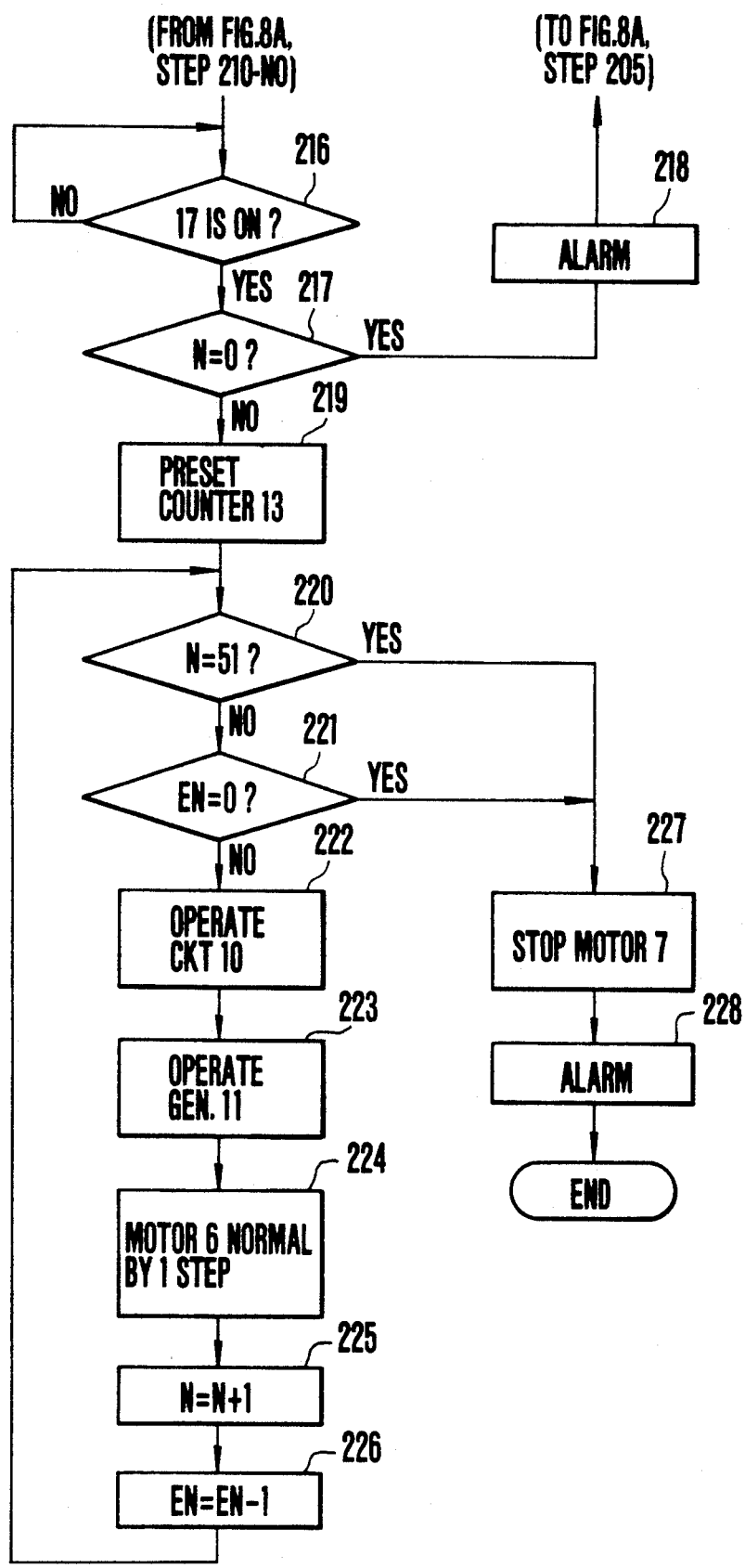

Next, when the erasing switch 17 is turned on (at a step 216 of FIG. 8B), the controller 8' again checks the count value N of the counter 12 to find whether it is N=0 (at a step 217 of FIG. 8B). If the count value is found to be N=0, the controller 8' turns on the alarm circuit 22 (at a step 218 of FIG. 8B). If it is found to be N≠0, the controller 8' causes the datum of the number of erasing tracks set by the switch 16 to be preset at the down counter 13 (at a step 219 of FIG. 8B). Then, if the count value N of the counter 12 is N≠51 (at a step 220 of FIG. 8B) and the count value EN of the counter 13 is EN=0 (at a step 221 of FIG. 8B), the controller 8' causes the piezoelectric bimorph element driving circuit 10 to operate in the manner described with reference to FIGS. 4A, 4B and 5 in the foregoing (at a step 222 of FIG. 8B). Furthermore, the controller 8' also causes the erasing signal generator 11 to operate (at a step 223 of FIG. 8B). Thus, one track set with the switch 14U or 14D operated is erased in the same manner as described in FIGS. 4 and 5 in the foregoing. Then, upon completion of the erasing process on this specific track, the controller 8' causes the driving circuit 9 to normally rotate the motor 6 one step (at a step 224 of FIG. 8B). This brings the head 2 to the next track. At this instant, the controller 8' causes the counter 12 to count by one (at a step 225 of FIG. 8B) and the counter 13 to count down by one (at a step 226 of FIG. 8B). Following this, the controller 8' again judges whether the count value N of the counter 12 is N=51 (at the step 220 of FIG.

8B). If it is found to be N=51, the driving circuit 19 is instructed to bring the motor 7 to a stop (at a step 227 of FIG. 8B). The alarm circuit 22 is turned on (at a step 228 of FIG. 8B) to bring the erasing operation to an end. This means that the track set by the switch 14U was the 50th track. On the other hand, in the case of N≠51, the controller 8' judges whether the count value EN of the counter 13 is EN=0 (at the step 221 of FIG. 8B). If it is found to be EN=0, the controller 8' stops the motor 7 (at the step 227 of FIG. 8B) and turns the alarm circuit 22 on (at the step 228 of FIG. 8B), thus bringing the operation to a stop. This means that the number of tracks set by the switch 16 to be erased is 1 and that the setting corresponds to the single track erasing mode. Whereas, if it is found to be EN≠0, the operation of the controller 8' shifts to the step 222 of FIG. 8B. Then, the erasing operation described above is again repeatedly performed on a new track.

The above-stated steps of operation are repeated until either the count value of the counter 12 becomes N=51 or the count value EN of the counter 13 becomes EN=0. Thus, a plurality of selected tracks are consecutively erased one after another.

In case that, at the step 220 of FIG. 8B, a number of erasing tracks exceeding the effective number of erasing tracks is set by the switch 16, the apparatus automatically brings the erasing operation to an end upon completion of an erasing operation on the 50th track which is the last one.

Further, the erasing operation of the apparatus of course comes to an end upon completion of erasing of all the erasing tracks on the disc 1 if the erasing operation is arranged to begin with the first track and the number of erasing tracks set by the switch 16 is 50.

In the foregoing description of embodiments, the present invention is applied to apparatuses of the kind using a magnetic disc as record bearing medium. However, the invention is of course applicable also to apparatuses of different kinds using different record bearing media. The erasing apparatus according to this invention of course may be either arranged in a stand-alone form or arranged in a bult-in form in one unified assembly with a recording and/or reproducing apparatus.

Further, the invention is not limited to the embodiments described and various variations may be made therein within the true spirit and scope of the invention.

According to the invention as has been described in the foregoing, the signals recorded in selected recording tracks can be automatically and accurately erased with a simple operation from a rotating type record bearing medium having signals recorded in a plurality of circular recording tracks thereon.

What is claimed is:

1. An apparatus comprising:
   a) erasing means for erasing signals recorded in recording means which have a plurality of blocks;
   b) first designation means for designating a position of a first block to be erased prior to the erasing operation by said erasing means, said first designation means including A) first operation means for changing a block accessed by said erasing means in a first direction, and B) second operation means for changing a block accessed by said erasing means in a second direction different from said first direction; and
   c) manually operable second designation means for designating a number of blocks to be successively erased from said first block designated by said first designation means, without designating a start block to be erased.

2. An apparatus according to claim 1, wherein said recording means is a disc-like recording medium form.

3. An apparatus according to claim 1, wherein said recording means is a magnetic recording medium.

4. An apparatus according to claim 3, wherein said recording means is of disc-like form.

5. An apparatus according to claim 4, said erasing means erases information on said recording means.

6. An apparatus according to claim 5, wherein said erasing means includes:
   (a) a head for erasing signals recorded on a plurality of blocks on said recording means;
   (b) access means for causing the head to access the plurality of blocks automatically in a predetermined sequence; and
   (c) control means for actuating the head for erasure.

7. An apparatus according to claim 1, wherein said second direction is reverse to said first direction.

8. An apparatus according to claim 7, wherein said second designation means includes a dial for designating the number of blocks to be erased beginning with the first block designated by said first designation means.

9. An erasing device, comprising:
   a) a head for erasing signals recorded on a plurality of tracks of a recording medium;
   b) access means for making the head access the plurality of tracks automatically in predetermined sequence;
   c) control means for actuating the head for the erasure;
   d) first designation means for designating the position of a first track to be erased prior to the erasing operation, said first designation means including first operation means for renewing the track which the head is made to access by said access means in a first direction, and second operation means for renewing said track which the head is made to access by said access means in a second direction different from said first direction; and
   e) second designation means for designating a number of tracks to be erased beginning from the first track designated by the first designation means.

10. An erasing device comprising:
    a) a head for erasing signals recorded on a plurality of tracks of a recording medium;
    b) access means for making the head access the plurality of tracks automatically in predetermined sequence;
    c) control means for actuating the head for the erasure;
    d) first designation means for designating the position of a first track to be erased prior to the erasing operation; and
    e) second designation means including a dial, for designating the number of tracks to be erased, beginning with the first track designated by the first designation means.

11. An erasing device according to claim 10, wherein said recording medium is of disc-like form.

12. An erasing device according to claim 11, wherein said access means causes a plurality of tracks to be accessed by said head by moving said head over a radius of said medium.

13. An erasing device according to claim 10, wherein said medium is a magnetic medium.

14. An erasing device according to claim 13, wherein said control means actuates erasure by generating a magnetic field for erasing in said head.

15. An erasing device for processing storing means which can store a plurality of images, comprising:
   erasing means for effecting erasing operation of said storing means;
   change-over means for changing over the erasing means, before effecting the erasing operation, between a state where a single image is to be erased and another state where a plurality of images are to be continuously erased;
   setting means for setting a number of images to be erased in the state where the plurality of images are to be continuously erased and said setting means includes a dial for setting a number corresponding to said plurality of images; and
   control means for controlling said erasing means so that said erasing means is operated to erase only the single image when the erasing means is changed over by said change-over means to the state where the single image is to be erased and said erasing means is operated to erase the number of images set by said setting means when the erasing means is changed over by said change-over means to the state where the plurality of images are to be continuously erased.

16. A device according to claim 15, wherein said storing means is disc-shaped.

* * * * *